United States Patent
Marsh

(10) Patent No.: US 11,940,545 B2
(45) Date of Patent: Mar. 26, 2024

(54) METHODS AND APPARATUSES FOR AUTOMATIC OBJECT HEADING DETERMINATIONS

(71) Applicant: Honeywell International Inc., Charlotte, NC (US)

(72) Inventor: Brian John Marsh, Freeport, IL (US)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 18/299,545

(22) Filed: Apr. 12, 2023

(65) Prior Publication Data

US 2023/0251390 A1     Aug. 10, 2023

Related U.S. Application Data

(63) Continuation of application No. 17/468,399, filed on Sep. 7, 2021, now Pat. No. 11,650,333.

(51) Int. Cl.
*G01S 19/49* (2010.01)
*G01S 19/42* (2010.01)
*G01S 19/47* (2010.01)

(52) U.S. Cl.
CPC ............ *G01S 19/47* (2013.01); *G01S 19/428* (2013.01); *G01S 19/49* (2013.01)

(58) Field of Classification Search
CPC ......... G01S 19/47; G01S 19/428; G01S 19/49
See application file for complete search history.

(56) References Cited

U.S. PATENT DOCUMENTS

| 5,469,158 A | 11/1995 | Morita |
| 5,657,025 A | 8/1997 | Ebner et al. |

FOREIGN PATENT DOCUMENTS

| CN | 107132563 B | 4/2020 |
| CN | 109143304 B | 12/2020 |
| EP | 0567268 A1 | 10/1993 |
| EP | 0763749 A1 | 3/1997 |
| WO | 2012/075463 A1 | 6/2012 |

OTHER PUBLICATIONS

European search report dated Feb. 3, 2023 for EP Application No. 22189208, 12 page(s).
European search report dated May 9, 2023 for EP Application No. 22189208, 11 page(s).
Notice of Allowance and Fees Due (PTOL-85) dated Jan. 12, 2023 for U.S. Appl. No. 17/468,399.

*Primary Examiner* — Mathew Franklin Gordon
(74) *Attorney, Agent, or Firm* — Alston & Bird LLP

(57) ABSTRACT

Method, apparatuses, and computer program products for automatically tracking a heading of an object. An example method comprising receiving, one or more internal measurement values which pertain to an object; determining an internal heading uncertainty value for each internal measurement value of the one or more internal measurement values; generating, using a probabilistic heading model, an estimated heading data object for the object based at least in part on the one or more internal measurement values; and providing the estimated heading data object to one or more associated user devices.

16 Claims, 6 Drawing Sheets

METHODS AND APPARATUSES FOR AUTOMATIC OBJECT HEADING DETERMINATIONS

CROSS-REFERENCE TO RELATED APPLICATIONS

This patent application is a continuation of U.S. patent application Ser. No. 17/468,399, filed Sep. 7, 2021, which is incorporated herein by reference in its entirety.

BACKGROUND

Heading tracking solutions may be used for various applications, such as for vehicle tracking, asset tracking, navigation, logical geofencing, and the like. Such location tracking solutions may be used to determine an object heading such that the direction the object is traveling may be determined. Conventionally, heading tracking technologies, such as global positioning system (GPS) signaling, may be used to determine the heading of a tracked object.

BRIEF SUMMARY

Various embodiments described herein relate to methods, apparatuses, and systems for automatically track a heading of an object.

In accordance with various examples of the present disclosure, a method, apparatus, and computer program product are disclosed for automatically tracking a heading of an object. In this regard, the method, apparatus and computer program product are configured to generate an estimated heading data object based at least in part on one or more received internal measurement values. The estimated heading data object may be provided to one or more associated user devices.

In an example embodiment, a method is provided that includes receiving, using one or more processors, one or more internal measurement values which pertain to an object, wherein each internal measurement value corresponds to a particular time point and wherein the one or more internal measurement values are measured by an inertial measurement unit associated with the object. The method further includes determining, using the one or more processors, an internal heading uncertainty value for each internal measurement value of the one or more internal measurement values. The method further includes generating, using the one or more processors and a probabilistic heading model, an estimated heading data object for the object based at least in part on the one or more internal measurement values, wherein the estimated heading data object describes one or more estimated heading values for the object. The method further includes providing, using the one or more processors, the estimated heading data object to one or more associated user devices.

In some example embodiments, the method further includes receiving, using one or more processors, one or more satellite navigation location values for the object, wherein each satellite navigation location value corresponds to a particular time point. The method may further include determining, using the one or more processors, a satellite navigation location uncertainty value for each satellite navigation location value. In some embodiments, the estimated heading data object for the object is based at least in part on the one or more internal measurement values and one or more satellite navigation location values. In some embodiments, each global positioning uncertainty value is based at least in part on the time duration between two or more received satellite navigation location values.

In some embodiments, the internal heading uncertainty value is based at least in part on the time duration between two or more determined internal measurement values. In some embodiments, the estimated heading data object further describes one or more estimated location uncertainty values for one or more of the one or more estimated heading values.

In some example embodiments, the method further includes detecting, using the one or more processors, an error event. The method may further include in response to the detection of the error event, generating, using the one or more processors, a heading error data object. In some embodiments, the error event is detected in response to a determination that the estimated heading data object fails to satisfy one or more estimated heading threshold values.

In some example embodiments, the method further includes receiving, from one or more locator units, one or more locator location values for the object. The method may further include determining, using the one or more processors, a locator location uncertainty value for each locator location value. In some embodiments, generating the estimated heading data object for the object is based at least in part on the one or more internal measurement values and one or more locator location values.

In an example embodiment, an apparatus is provided wherein the apparatus comprising at least one processing component configured to receive one or more internal measurement values which pertain to an object, wherein each internal measurement value corresponds to a particular time point and wherein the one or more internal measurement values are measured by an inertial measurement unit associated with the object. The at least one processing component is further configured to determine an internal heading uncertainty value for each internal measurement value of the one or more internal measurement values. The at least one processing component is further configured to generate, using a probabilistic heading model, an estimated heading data object for the object based at least in part on the one or more internal measurement values, wherein the estimated heading data object describes one or more estimated heading values for the object. The at least one processing component is further configured to provide the estimated heading data object to one or more associated user devices.

In some example embodiments, the at least one processing component is further configured to receive one or more satellite navigation location values for the object, wherein each satellite navigation location value corresponds to a particular time point. The at least one processing component may further be configured to determine a satellite navigation location uncertainty value for each satellite navigation location value. In some embodiments, the estimated heading data object for the object is based at least in part on the one or more internal measurement values and one or more satellite navigation location values. In some embodiments, each global positioning uncertainty value is based at least in part on the time duration between two or more received satellite navigation location values.

In some embodiments, the internal heading uncertainty value is based at least in part on the time duration between two or more determined internal measurement values. In some embodiments, the estimated heading data object further describes one or more estimated location uncertainty values for one or more of the one or more estimated heading values.

In some example embodiments, the at least one processing component is further configured to detect an error event. The at least one processing component is further configured to, in response to the detection of the error event, generate a heading error data object. In some embodiments, the error event is detected in response to a determination that the estimated heading data object fails to satisfy one or more estimated heading threshold values.

In some example embodiments, the at least one processing component is further configured to receive, from one or more locator units, one or more locator location values for the object. The at least one processing component is further configured to determine a locator location uncertainty value for each locator location value. In some embodiments, generating the estimated heading data object for the object is based at least in part on the one or more internal measurement values and one or more locator location values.

In accordance with various examples of the present disclosure, a computer program product is provided. The computer-program comprising at least one non-transitory computer-readable storage medium having computer-readable program code portions stored therein, the computer-readable program code portions configured, upon execution, to receive one or more internal measurement values which pertain to an object, wherein each internal measurement value corresponds to a particular time point and wherein the one or more internal measurement values are measured by an inertial measurement unit associated with the object. The computer-readable program code portions are further configured to determine an internal heading uncertainty value for each internal measurement value of the one or more internal measurement values. The computer-readable program code portions are further configured to generate, using a probabilistic heading model, an estimated heading data object for the object based at least in part on the one or more internal measurement values, wherein the estimated heading data object describes one or more estimated heading values for the object. The computer-readable program code portions are further configured to provide the estimated heading data object to one or more associated user devices.

In some example embodiments, the computer-readable program code portions are further configured to receive one or more satellite navigation location values for the object, wherein each satellite navigation location value corresponds to a particular time point. The computer-readable program code portions are further configured to determine a satellite navigation location uncertainty value for each satellite navigation location value. In some embodiments, the estimated heading data object for the object is based at least in part on the one or more internal measurement values and one or more satellite navigation location values. In some embodiments, each global positioning uncertainty value is based at least in part on the time duration between two or more received satellite navigation location values.

In some embodiments, the internal heading uncertainty value is based at least in part on the time duration between two or more determined internal measurement values. In some embodiments, the estimated heading data object further describes one or more estimated location uncertainty values for one or more of the one or more estimated heading values.

In some example embodiments, computer-readable program code portions are further configured to detect an error event. The computer-readable program code portions are further configured to, in response to the detection of the error event, generate a heading error data object. In some embodiments, the error event is detected in response to a determination that the estimated heading data object fails to satisfy one or more estimated heading threshold values.

In some example embodiments, the computer-readable program code portions are further configured to receive, from one or more locator units, one or more locator location values for the object. The computer-readable program code portions are further configured to determine a locator location uncertainty value for each locator location value. In some embodiments, generating the estimated heading data object for the object is based at least in part on the one or more internal measurement values and one or more locator location values.

The foregoing illustrative summary, as well as other exemplary objectives and/or advantages of the disclosure, and the manner in which the same are accomplished, are further explained in the following detailed description and its accompanying drawings.

BRIEF DESCRIPTION OF THE DRAWINGS

The description of the illustrative embodiments may be read in conjunction with the accompanying figures. It will be appreciated that, for simplicity and clarity of illustration, elements illustrated in the figures have not necessarily been drawn to scale, unless described otherwise. For example, the dimensions of some of the elements may be exaggerated relative to other elements, unless described otherwise. Embodiments incorporating teachings of the present disclosure are shown and described with respect to the figures presented herein, in which.

DETAILED DESCRIPTION OF THE INVENTION

Figure 1:
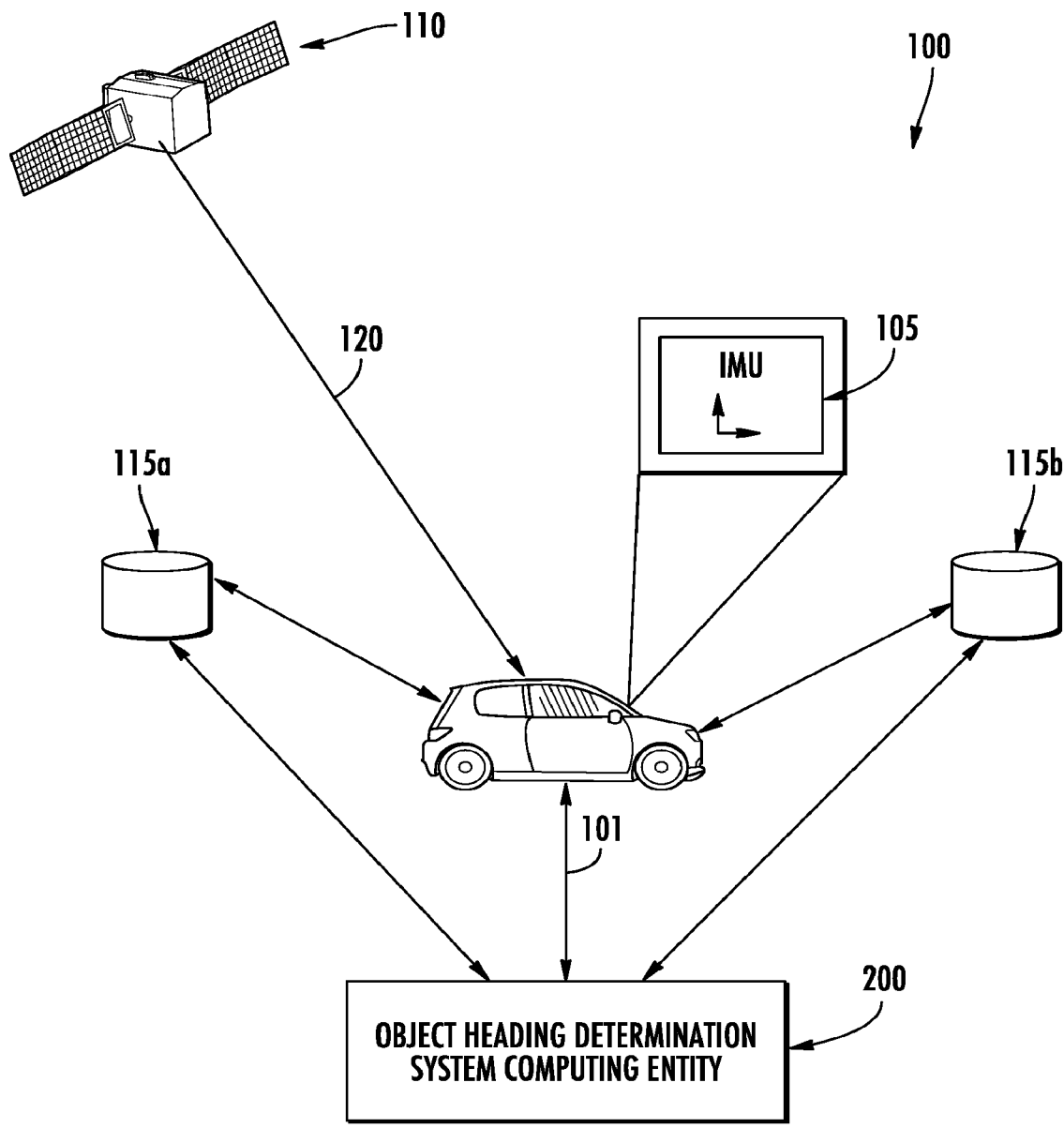
FIG. 1 illustrates an example environment in which an object may operate and in which a heading determining system may be used in accordance with various embodiments of the present disclosure.

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

The components illustrated in the figures represent components that may or may not be present in various embodiments of the present disclosure described herein such that embodiments may include fewer or more components than those shown in the figures while not departing from the scope of the present disclosure. Some components may be omitted from one or more figures or shown in dashed line for visibility of the underlying components.

The phrases "in an example embodiment," "some embodiments," "various embodiments," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such components or features may be optionally included in some embodiments, or may be excluded.

The term "electronically coupled" or "in electronic communication with" in the present disclosure refer to two or more electrical elements (for example, but not limited to, a computational platform, predictive data analysis system, sensing unit, warehouse management system, and control unit) and/or electric circuit(s) being connected through wired means (for example but not limited to, conductive wires or traces) and/or wireless means (for example but not limited to, wireless network, electromagnetic field), such that data and/or information (for example, electronic indications, signals) may be transmitted to and/or received from the electrical elements and/or electric circuit(s) that are electronically coupled.

Location tracking solutions may be used for various applications, such as for vehicle tracking, asset tracking, navigation, logical geofencing, and the like. Common location tracking solutions may include GPS signaling or other navigation satellite system data signaling to determine the location of a particular object, such as a vehicle configured with a receiver capable of receiving navigation satellite signals. Such navigation satellite signaling may be used to make various determinations about the object, such as the location of the object and over time, object heading, acceleration, speed, etc.

However, such navigation satellite signaling may not always be dependable or reliable, particularly within certain environments, such as environments which contain a plurality of objects which interfere with navigation satellite signaling. For example, a city containing many tall buildings may interfere with an object receiving GPS signaling. As another example, an area that is densely populated with interfering objects, such as solar cells on a solar cell farm, may also interfere with an object receiving GPS signaling. Such interference with navigation satellite signaling may make determining the location of the object within such environments difficult and/or inaccurate. Furthermore, navigation satellite signaling is limited to the provision of two-dimensional coordinates for the object. However, often objects may navigate terrains which experience frequent changes in elevation and/or have multiple levels elevation tiers, such as a parking ramp.

As such, it may be beneficial, in some examples, to automatically track a heading of object based at least in part one or more internal measurement values as received from an inertial measurement unit of the object. A probabilistic heading model may process the one or more internal measurement values and generate an estimated heading data object for the object, indicative of an estimated heading value for the object. The one or more internal measurement values may be obtained in real-time or near real-time such that the one or more estimated heading values described by the estimated heading data object reflect an up-to-date and accurate object heading determinations. To that end, the present disclosure, in some examples, provides a method, apparatus, and computer program product for automatically tracking a heading of an object using one or more internal measurement values. In some embodiments, one or more satellite navigation location values may also be processed by the probabilistic heading model to generate the estimated heading data object for object. In some embodiments, one or more locator location values may also be processed by the probabilistic heading model to generate the estimated heading data object for object.

FIG. 1 depicts an example environment 100 in which a heading determining system may be used. In some embodiments, an object 101 and object heading determination system computing entity 200 may be configured to communicate over a communication network (not shown). The communication network may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like). The object 101 may be configured with an onboard computing device capable of transmitting and/or receiving signals to/from an object heading determination system computing entity 200. The communication network may also enable communication between the object 101, object heading determination system computing entity 200, and one or more locator units 115a and 115b.

The object heading determination system computing entity 200 may comprise any number of one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities. In some embodiments, the object heading determination system computing entity may be configured to perform one or more steps/operations associated with automatically tracking a heading of object 101.

An object 101 may be any object that is configured with an inertial measurement unit (IMU) 105. In some embodiments, the object 101 may be a vehicle such as a car, drone, aircraft, nautical vessel, lawn mower, and/or the like. The IMU 105 of object 101 may be positioned anywhere on or within the object 101 such that it is capable of detecting changes in location, acceleration, orientation, and/or the like for the object 101. The IMU 105 may also be initialized with regard to a reference axis. For example, each rotation angles of an associated set of rotation angles may be initialized at 0 with respect to a particular orientation. In particular, an x-axis rotation angle, y-axis rotation angle, and z-axis rotation angle, which may be denoted by a (x,y,z) format, may each be initialized to (0,0,0) at a period when the object is positioned on a substantially planar surface. As such, the IMU 105 associated with the object 101 may detect changes in orientation in each desired axis (i.e. x-axis, y-axis, and/or z-axis). The measurements determined by the IMU 105 may be provided to one or more computing entities, such as an object heading determination system computing entity 200, and may serve as the one or more internal measurement values for the object 101.

In addition to the IMU 105 measurements, in some embodiments, the object 101 may be configured to receive navigational satellite signals 120 from a satellite 110. In some embodiments, an object 101 may include a global navigation satellite system (GNSS) or other satellite receiver for receiving GPS, GLONASS, Galileo, BeiDou, Compass or other navigation satellite signals. In some embodiments, the object 101 may be configured to only receive navigational satellite signals 120 periodically, semi-periodically, and/or on-demand. The object 101 may be configured to provide one or more satellite navigation system location values to the object heading determination system computing entity 200. Through the controlled provision of navigational satellite signaling, computational resources for the object and/or an object heading determination system computing entity 200 may be conserved.

Additionally, in some embodiments, the object 101 may be configured with a transmitter and/or receiver to receive and/or transmit cellular signals, Wi-Fi signals, Bluetooth signals, UWB, NB-IoT, or other radio frequency (RF) signals. Such signals may be transmitted and/or received by one or more locator units, such as 115a-b. Additionally or alternatively, optical signaling and/or acoustic signaling may be used. Similarly, the one or more locator units 115a and/or 115b may be configured with a transmitter and/or receiver to receive and/or transmit cellular signals, Wi-Fi signals, Bluetooth signals, UWB, NB-IoT, or other radio frequency (RF) signals. In some embodiments, the object 101 may transmit a single signal to the locator unit 115a and/or 115b. In some embodiments, the object 101 may be configured to simultaneously transmit a plurality of signals to the locator unit 115a and/or 115b. In some embodiments, the locator unit 115a and/or 115b may transmit a single signal and/or plurality of signals to the object 101.

Each locator unit of the one or more locator units may be associated with a particular placement location. The placement location may be indicated in a variety of ways, such as by a set of coordinates which corresponds to each locator unit. Furthermore, each locator unit may be associated with a proximity range, within which it may transmit and/or receive signals from object 101. As such, if an object 101 is detected by a particular locator unit with a known location and proximity range, the location of the object 101 may be narrowed to within the proximity range associated with the locator unit 115a and/or 115b. Furthermore, the granularity with which the object 101 is able to detected may be controlled by the number of locator units within a particular area. For example, the object 101 may be detected by locator unit 115a when it enters into a proximity range of locator unit 115a. As such, the location of the object 101 is determined to be within the proximity range of locator unit 115a. In an instance the object 101 is also detected by the locator unit 115b, the location of the object 101 may be refined to be within an area which the proximity ranges of locator unit 115a and 115b overlap.

In some embodiments an elevation angle and azimuthal angle may be determined between the object 101 and the one or more locator units based at least in part on an angle of arrival (AOA) and/or angle of departure (AOD). The elevation angle may be indicative of the height of the object relative to a particular reference point and the azimuthal angle direction of the object 101 relative to a reference point. In some embodiments, the location of the object may be determined based at least in part on the one or more elevation angles and/or one or more azimuthal angles as determined based at least in part on the AOA and/or AOD.

The associated placement location and range for each locator unit of the one or more locator units may be stored in an associated memory of the object heading determination system computing entity 200. Furthermore, the one or more locator units 115a and 115b may be communicatively coupled to the object heading determination system computing entity 200 such that the locator units 115a and 115b may provide the object heading determination system computing entity 200 with one or more locator location values.

Figure 2:
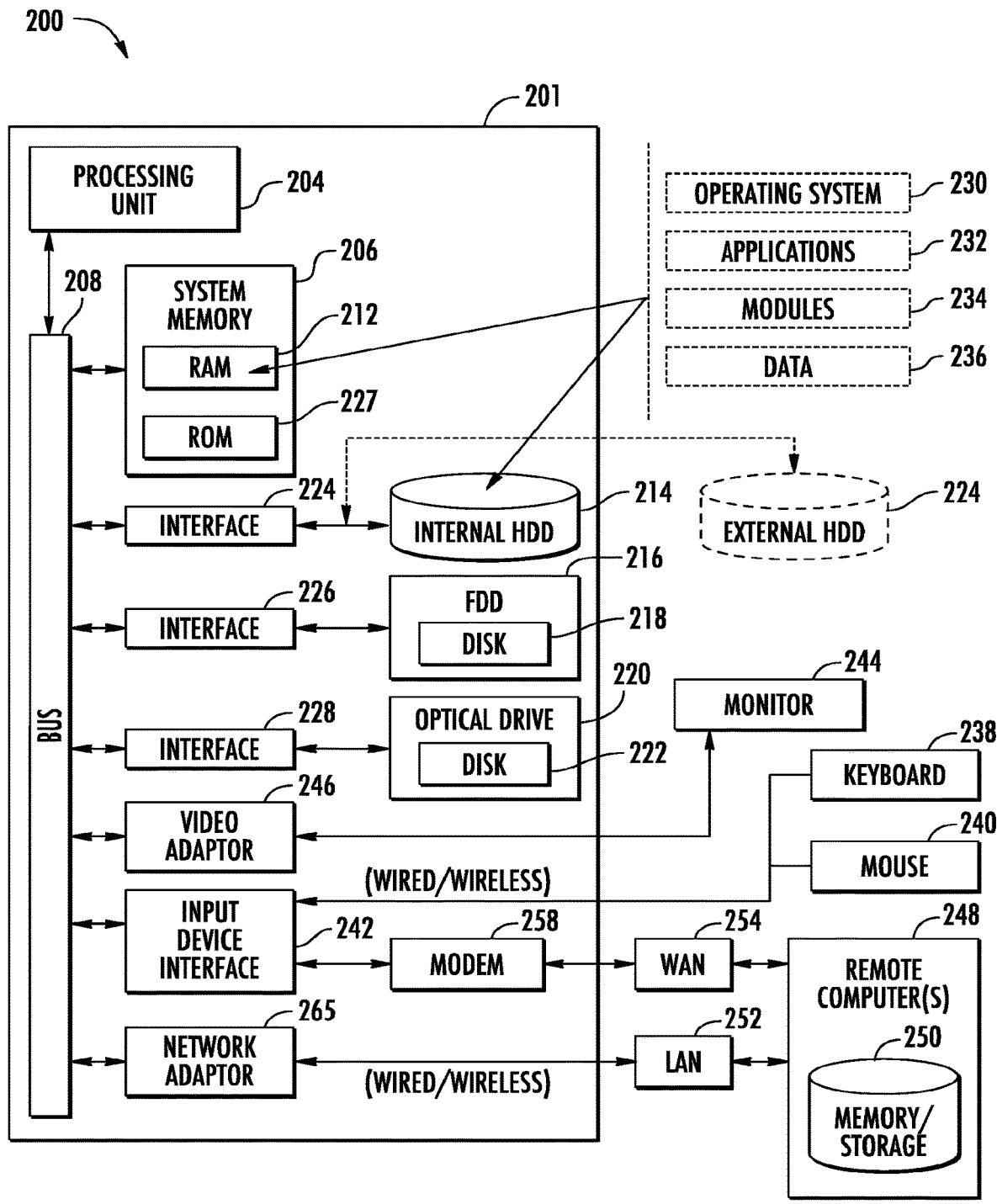
FIG. 2 illustrates an example apparatus in accordance with various embodiments of the present disclosure.

Referring now to FIG. 2, there is illustrated a block diagram of a computer entity 200, operable to execute the functions and operations performed in the described example embodiments. For example, a computing device (e.g. an object heading determination system computing entity) may contain components as described in FIG. 2. The computing entity 200 can provide networking and communication capabilities between a wired or wireless communication network and a server and/or communication device. In order to provide additional context for various aspects thereof, the following discussion are intended to provide a brief, general description of a suitable computing environment in which the various aspects of the embodiments can be implemented to facilitate the establishment of a transaction between an entity and a third party. While the description above is in the general context of computer-executable instructions that can run on one or more computing entities, those skilled in the art will recognize that the various embodiments also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the various embodiments can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computing entity and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 2, implementing various aspects described herein with regards to the end-user device can include a computing entity 200, the computing entity 200 including a processing unit 204, a system memory 206 and a system bus 208. The system bus 208 couples system components including, but not limited to, the system memory 206 to the processing unit 204. The processing unit 204 can be any of various commercially available processors. Dual microprocessors and other multi-processor architectures can also be employed as the processing unit 204.

The system bus 208 can be any of several types of bus structure that can further interconnect to a memory bus (with or without a memory controller), a peripheral bus, and a local bus using any of a variety of commercially available bus architectures. The system memory 206 includes read-only memory (ROM) 227 and random access memory (RAM) 212. A basic input/output system (BIOS) is stored in a non-volatile memory 227 such as ROM, EPROM, EEPROM, which BIOS contains the basic routines that help to transfer information between elements within the computing entity 200, such as during start-up. The RAM 212 can also include a high-speed RAM such as static RAM for caching data.

The computing entity 200 further includes an internal hard disk drive (HDD) 214 (e.g., EIDE, SATA), which internal hard disk drive 214 can also be configured for external use in a suitable chassis (not shown), a magnetic floppy disk drive (FDD) 216, (e.g., to read from or write to a removable diskette 218) and an optical disk drive 220, (e.g., reading a CD-ROM disk 222 or, to read from or write to other high capacity optical media such as the DVD). The hard disk drive 214, magnetic disk drive 216 and optical disk drive 220 can be connected to the system bus 208 by a hard disk drive interface 224, a magnetic disk drive interface 226 and an optical drive interface 228, respectively. The interface 224 for external drive implementations includes at least one or both of Universal Serial Bus (USB) and IEEE 1394 interface technologies. Other external drive connection technologies are within contemplation of the subject embodiments.

The drives and their associated computer-readable media provide nonvolatile storage of data, data structures, computer-executable instructions, and so forth. For the computing entity 200 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computing entity 200, such as zip drives, magnetic cassettes, flash memory cards, cartridges, and the like, can also be used in the example operating environment, and further, that any such media can contain computer-executable instructions for performing the methods of the disclosed embodiments.

A number of program modules can be stored in the drives and RAM 212, including an operating system 230, one or more application programs 232, other program modules 234 and program data 236. All or portions of the operating system, applications, modules, and/or data can also be cached in the RAM 212. It is to be appreciated that the various embodiments can be implemented with various commercially available operating systems or combinations of operating systems.

A user can enter commands and information into the computing entity 200 through one or more wired/wireless input devices, e.g., a keyboard 238 and a pointing device, such as a mouse 240. Other input devices (not shown) may include a microphone, an IR remote control, a joystick, a game pad, a stylus pen, touch screen, or the like. These and other input devices are often connected to the processing unit 204 through an input device interface 242 that is coupled to the system bus 208, but can be connected by other interfaces, such as a parallel port, an IEEE 1394 serial port, a game port, a USB port, an IR interface, etc.

A monitor 244 or other type of display device is also connected to the system bus 208 through an interface, such as a video adapter 246. In addition to the monitor 244, a computing entity 200 typically includes other peripheral output devices (not shown), such as speakers, printers, etc.

The computing entity 200 can operate in a networked environment using logical connections by wired and/or wireless communications to one or more remote computing entities, such as a remote computing entity 248. The remote computing entity 248 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 250 is illustrated. The logical connections depicted include wired/wireless connectivity to a local area network (LAN) 252 and/or larger networks, e.g., a wide area network (WAN) 254. Such LAN and WAN networking environments are commonplace in offices and companies, and facilitate enterprise-wide computer networks, such as intranets, all of which may connect to a global communications network, e.g., the Internet. In some embodiments, a controller area network (CAN) interface (not shown) may additionally or alternatively facilitate wired or wireless communication between devices via associated microcontrollers and may perform one or more functionalities, operations, and/or the like associated with the LAN 252 and/or WAN 254.

When used in a LAN networking environment, the computing entity 200 is connected to the local network 252 through a wired and/or wireless communication network interface or adapter 256. The adapter 256 may facilitate wired or wireless communication to the LAN 252, which may also include a wireless access point disposed thereon for communicating with the wireless adapter 256.

When used in a WAN networking environment, the computing entity 200 can include a modem 258, or is connected to a communications server on the WAN 254, or has other means for establishing communications over the WAN 254, such as by way of the Internet. The modem 258, which can be internal or external and a wired or wireless device, is connected to the system bus 208 through the input device interface 242. In a networked environment, program modules depicted relative to the computer, or portions thereof, can be stored in the remote memory/storage device 250. It will be appreciated that the network connections shown are exemplary and other means of establishing a communications link between the computers can be used.

The computing entity is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments comprise a system as well as a computer-readable medium having computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information.

In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Additionally, embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware framework and/or operating system platform. A software component comprising assembly language instructions may require conversion into executable machine code by an assembler prior to execution by the hardware framework and/or platform. Another example programming language may be a higher-level programming language that may be portable across multiple frameworks. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatuses, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Figure 3:
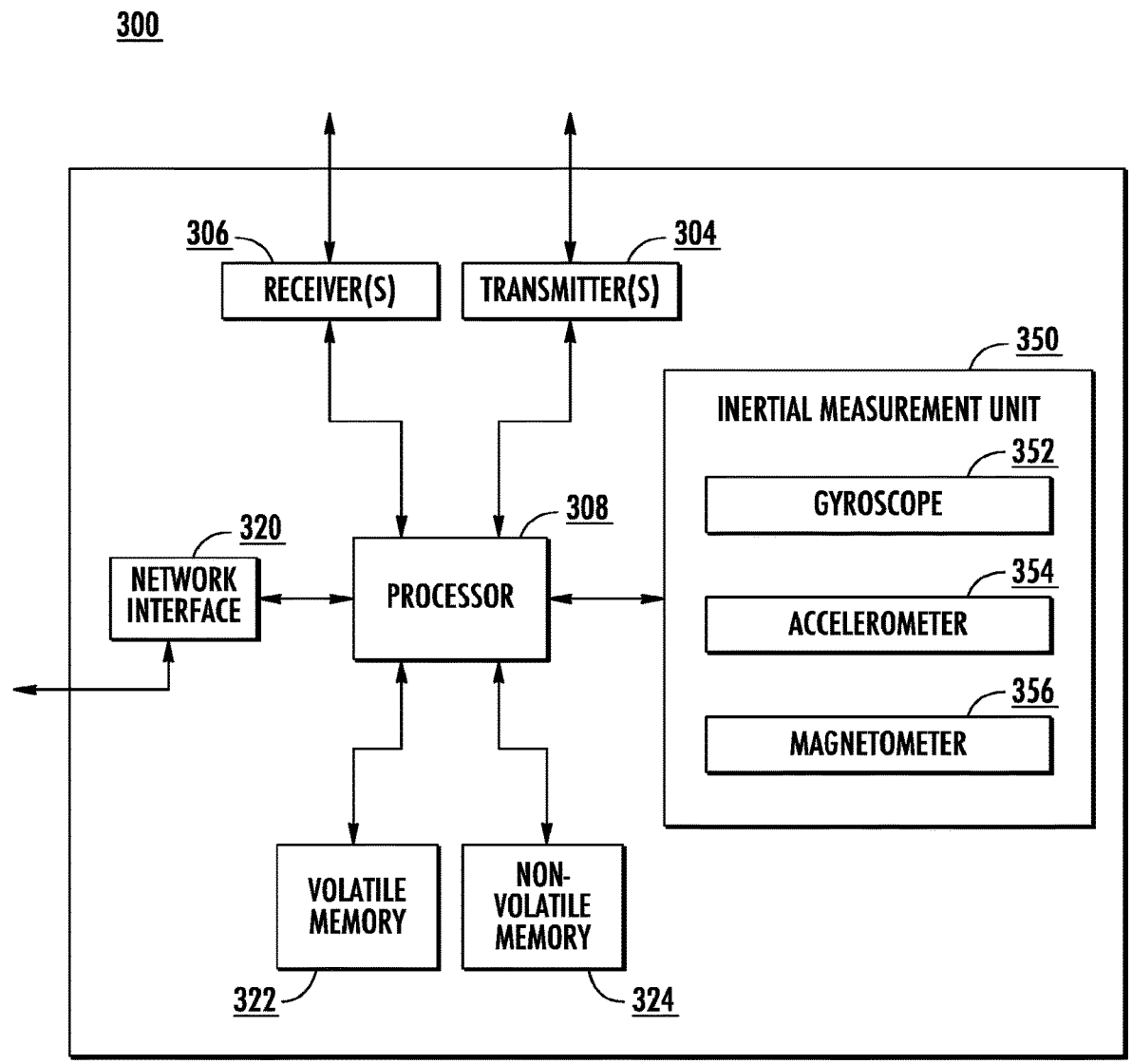
FIG. 3 illustrates an example apparatus in accordance with various embodiments of the present disclosure.

FIG. 3 provides an illustrative schematic representative of computing entity 300 that can be used in conjunction with embodiments of the present invention. In some embodiments the computing entity 300 is a computing entity operated by or in conjunction with the object 101. In some embodiments, the computing entity 300 is a computing entity onboard object 101. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, steps/operations, and/or processes described herein. The computing entity 300 can be operated by various parties. As shown in FIG. 3, the computing entity 300 can include one or more transmitters 304 (e.g., radio), one or more receivers 306 (e.g., radio), and a processor 308 (e.g., CPLDs, microprocessors, multi-core processors, coprocessing entities, ASIPs, microcontrollers, and/or controllers) that provides signals to and receives signals from the one or more transmitters 304 and one or more receivers 306, correspondingly.

The signals provided to and received from the one or more transmitters 304 and the one or more receivers 306, correspondingly, may include signaling information/data in accordance with air interface standards of applicable wireless systems. In this regard, the computing entity 300 may be capable of operating with one or more air interface standards, communication protocols, modulation types, and access types. More particularly, the computing entity 300 may operate in accordance with any of a number of wireless communication standards and protocols, such as those described above with regard to the computing entity 200. In a particular embodiment, the computing entity 300 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the computing entity 300 may operate in accordance with multiple wired communication standards and protocols, such as those described above with regard to the computing entity 200 via a network interface 320.

Via these communication standards and protocols, the computing entity 300 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The computing entity 300 can also download changes, add-ons, and updates, for instance, to its firmware, software (e.g., including executable instructions, applications, program modules), and operating system.

According to one embodiment, the computing entity 300 may include location determining aspects, devices, modules, functionalities, and/or similar words used herein interchangeably. For example, the computing entity 300 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the computing entity 300 position in connection with a variety of other systems, including cellular towers, Wi-Fi access points, and/or the like. Similarly, the computing entity 300 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The computing entity 300 can also include an inertial measurement unit 350 configured to measure changes in position and/or orientation of the computing entity 300. In some embodiments, the inertial measurement unit 350 comprises one or more gyroscope 352, one or more accelerometers 354, and/or one or more magnetometers 356. The one or more gyroscopes 352 may include electromechanical devices for measuring angular velocity with respect to an x-axis, y-axis, and/or z-axis. The one or more accelerometers 354 may include electromechanical devices for measuring acceleration forces in an x-axis, y-axis, and/or z-axis with respect to a computing entity, such as computing entity 300. The one or more magnetometers may include electromechanical devices for measuring magnetic forces with respect to the x-axis, y-axis, and/or z-axis.

The computing entity 300 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the computing entity 300. As indicated, this may include a user application that is resident on the entity or accessible through a browser or other user interface for communicating with the computing entity 200 and/or various other computing entities.

In another embodiment, the computing entity 300 may include one or more components or functionality that are the same or similar to those of the computing entity 200, as described in greater detail above. As will be recognized, these frameworks and descriptions are provided for exemplary purposes only and are not limiting to the various embodiments.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatuses, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

Figure 4:
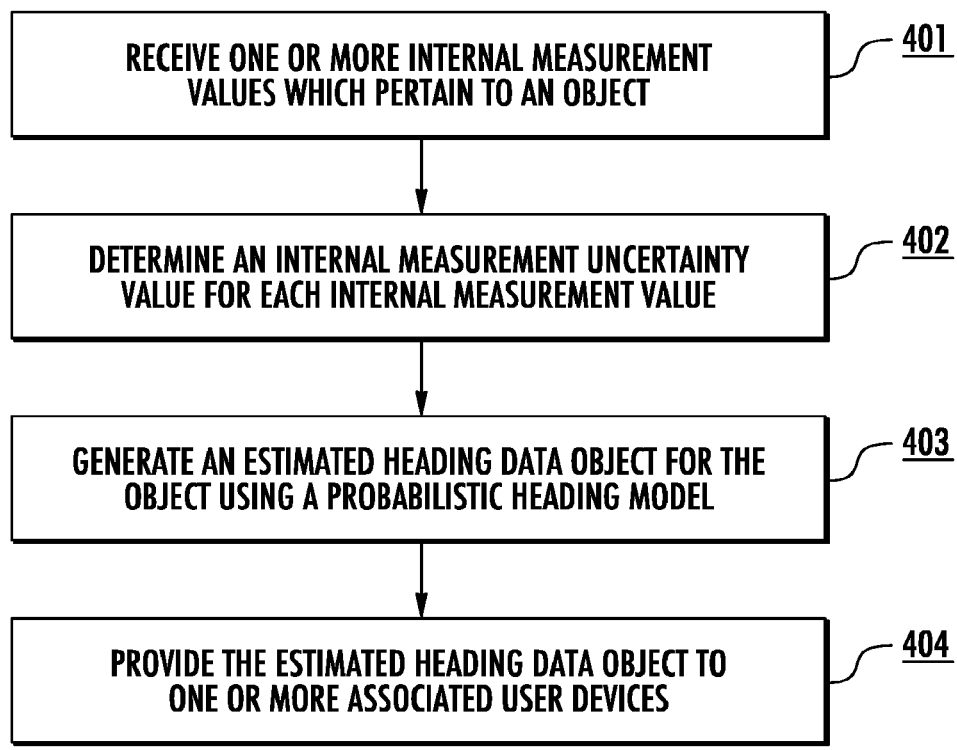
FIG. 4 is a flowchart diagram representing an example process generating an estimated heading data object in accordance with various embodiments of the present disclosure.

FIG. 4 is a flowchart diagram of an example process 400 for automatically tracking a heading for an object using a computing entity, such as computing entity 200 (e.g. object heading determination system computing entity). In some embodiments, the object heading determination system computing entity 200 may be associated with the object configured to determine the heading of the object in real-time or near real-time. In some embodiments, the object heading determination system computing entity 200 may be a cloud-based positioning computing entity that may operate in a cloud computing environment. Via the various steps/operations of the process 400, one or more estimated heading values may be determined for an object, such as object 101, such that the heading pertaining to the object may be accurately determined in real-time or near real-time.

The process 400 begins at step/operation 401 in which the object heading determination system computing entity 200, may include means such as the processing unit 204, network adaptor 265, input device interface 242, system memory 206, or the like, for receiving one or more internal measurement values for an object, such as object 101, via a network interface. The one or more internal measurement values may be determined using an inertial measurement unit, such as IMU 350, that is associated with the object 101. In some embodiments, the computing entity 200 may receive the one or more internal measurement values from a computing entity 300 associated with the object 101.

Each internal measurement value of the one or more internal measurement values may be associated with a particular time point. As such, the internal measurement values for the object may be determined in chronological order. From the one or more internal measurement values, one or more inference measurements pertaining to the object can be made. For example, the direction of travel, speed, elevation, and/or the like of the object may be determined based at least in part on the one or more internal measurements.

In some embodiments, the initially received internal measurement values corresponding to a first time point may be initialization internal measurement values. For example, the initialization internal measurement values may correspond to values which describe an initial position, orientation, and/or the like of the object. For example, a gyroscope of an object IMU may measure internal measurements values (10, 15, 20), indicative of 10 degrees rotation with respect to a reference x-axis, 15 degrees rotation with respect to a reference y-axis, and 20 degrees rotation with respect to a reference z-axis. As such, the initial internal measurement values may be received by the object heading determination system computing entity 200 and initialized as the initial internal measurement values. In some embodiments, the initialization internal measurement values may be initialized to 0 such that changes in orientation and or position of the object relative to an initial starting location may be monitored.

At step/operation 402, the computing entity 200 (e.g. object heading determination system computing entity), may include means such as the processing unit 204, network adaptor 265, input device interface 242, system memory 206, or the like, for determining an internal measurement uncertainty value for each internal measurement value. The IMU, such as IMU 350, which measures and provides the one or more internal measurement values may have one or more associated accuracy ranges for each component of the IMU 350. Further these accuracy ranges may vary between IMUs and their respective components. The accuracy range of the IMU 350 may be based at least in part on the one or more components of the IMU 350, including the gyroscope 352, accelerometer 354, and magnetometer 356. The accuracy range may be indicative of the maximum accuracy capable of being determined by the respective components of the IMU 350. For example, a gyroscope 352 of the IMU 350 may have an associated accuracy range of 0.2 degrees, indicative that measurements provided by the gyroscope 352 are accurate within 0.2 degrees above and below (+/−2 degrees) of the measurement.

In some embodiments, the IMU 350 and/or the one or more components of the IMU 350 including the gyroscope 352, accelerometer 354, and/or magnetometer 356 may each be associated with a component identifier, which uniquely identifies the particular component and/or component type, brand, etc. from other components. For example, a component identifier for a gyroscope may identify an individual gyroscope. Additionally or alternatively, a component identifier may identify a brand and model associated with the individual gyroscope such that gyroscopes of the same type are associated with the same component identifier. The one or more component identifiers may be received by the object heading determination system computing entity 200. The one or more component identifiers may be received before, during, or after receiving the object heading determination system computing entity 200 receives the one or more internal measurement values.

In some embodiments, the object heading determination system computing entity 200 may determine the internal measurement uncertainty values for each internal measurement value based at least in part on the one or more received component identifiers. For example, in some embodiments, the object heading determination system computing entity 200 may be configured with an internal measurement uncertainty value look-up table stored in an associated memory, such as system memory 206. The internal measurement uncertainty value look-up table may provide the one or more internal measurement uncertainty values for each component identifier. As such, the object heading determination system computing entity 200 may query the internal measurement uncertainty value look-up table using the one or more received component identifiers to determine one or more internal measurement uncertainty values.

Additionally or alternatively, the one or more internal measurement values may be based at least in part on a time duration between time duration between two or more internal measurement values. For example, if a time duration between two internal measurement values is short but the change between the two internal measurement value changes drastically, the internal measurement uncertainty value may be determined to be large. This large change between internal measurement values may indicate the particular IMU is inaccurate and should therefore the internal measurement values measured by the IMU should have a larger uncertainty value.

At step/operation 403, the computing entity 200 (e.g. object heading determination system computing entity), may include means such as the processing unit 204, system memory 206, or the like to generate an estimated heading data object using a probabilistic heading model. The probabilistic heading model may be configured to process at least the one or more internal measurement values to generate the estimated heading data object. The estimated heading data object may describe one or more estimated heading values for the object. In some embodiments, the one or more estimated heading values may include one or more current coordinates, one or more estimated coordinates predicted for one or more future times, a heading direction, and/or the like which pertain to the object.

The current coordinates and/or estimated coordinates may be coordinates of any sufficient form. For example, the coordinates may be x, y, and/or z coordinates which are relative to a particular reference point. The particular reference point may be any sufficient reference point such as a particular facility, object, environmental feature, sea level, and/or the like. As another example, the coordinates may be absolute latitudinal and/or longitudinal coordinates and/or an elevation value indicative of the height of an object in regard to a reference point.

In some embodiments, the probabilistic heading model employs Kalman filtering (i.e. linear quadratic estimation (LQE)) processing techniques to generate the estimated heading data object. The probabilistic heading model may process the one or more internal measurement values to generate the one or more estimated heading values. In some embodiments, the probabilistic heading model also processes the one or more determined internal measurement uncertainty values for each internal measurement. The one or more internal measurement uncertainty values may be indicative of the degree to weight the internal measurement value. For example, an internal measurement value with a high internal measurement uncertainty value may be weighted less as compared to an internal measurement value with a low internal measurement uncertainty value.

In some embodiments, the probabilistic heading model may also generate an estimated heading confidence value for each of the one or more estimated heading values for the object. The estimated heading confidence value may be based at least in part on the one or more internal measurement uncertainty values for each internal measurement value. In some embodiments, the estimated heading confidence value may also be based at least in part on one or more satellite navigation location uncertainty values for one or more satellite navigation location values and/or one or more locator location uncertainty values for one or more locator location values, which will be further discussed below with reference to FIGS. 5-6.

In some embodiments, the object heading determination system computing entity 200 may be configured to determine whether an estimated heading confidence value for an estimated heading value satisfies one or more estimated heading threshold values. The one or more estimated heading threshold values may be a set of one or more values indicative of an acceptable confidence value for an estimated heading value. In an instance one or more estimated heading values fail to satisfy the one or more estimated heading threshold values, an error event may be detected by object heading determination system computing entity 200. In response to detection of an error event, the object heading determination system computing entity 200 may generate a heading error data object. The heading error data object may be indicative that the one or more estimated heading values fail to satisfy the one or more estimated heading threshold values. The heading error data object may be provided to one or more associated user devices. As such, one or more end users associated with the one or more user devices may be informed that the estimated heading confidence value is out of range of an acceptable estimated heading confidence value as indicated by the estimated heading threshold value.

In some embodiments, the object heading determination system computing entity 200 may be configured to receive the one or more internal measurement values as well as one or more satellite navigation location values for the object and/or one or more locator location values for the object. The one or more satellite navigation location values for the object and/or one or more locator location values for the object may be used to improve the accuracy the tracked heading of the object. For example, an initial satellite navigation location value may be used to initialize a starting position for an object and the one or more internal measurement values which pertain to the object may be used to determine at least to generate the estimated heading data object. The object heading determination system computing entity 200 may receive periodic, semi-periodic, and/or on-demand satellite navigation location values for the object when pertinent and/or available. Additionally or alternatively, the object heading determination system computing entity 200 may receive one or more locator location values, such as from one or more locator units, when available. As such, the object heading determination system computing entity 200 may use the received one or more satellite navigation location values and/or one or more locator location values in addition to the one or more internal measurement values to generate the estimated heading data object. Receipt of the one or more satellite navigation location values and one or more locator location values will be described in more detail in FIGS. 5 and 6, respectively.

Figure 5:
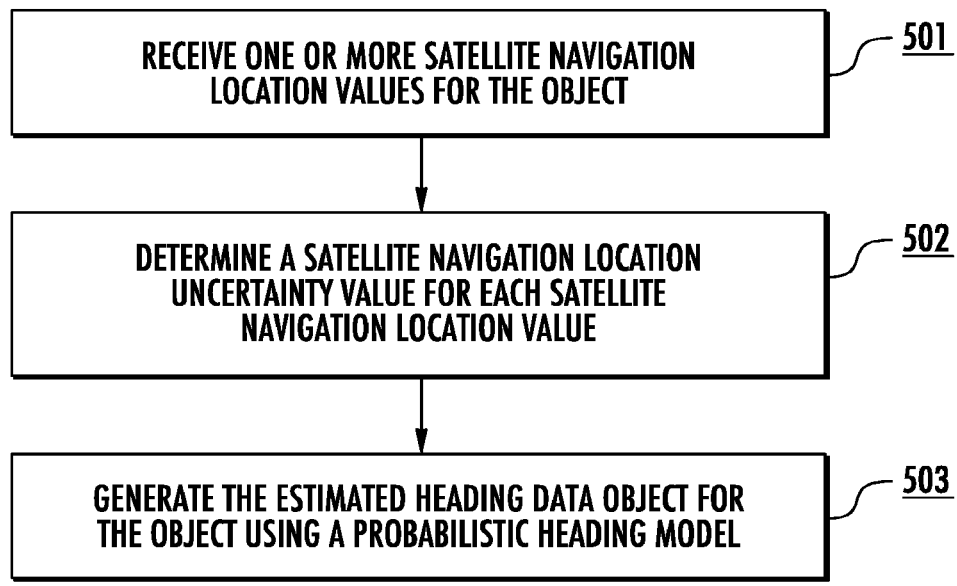
FIG. 5 is a flowchart diagram representing an example process receiving one or more satellite navigation location values for a vehicle in accordance with various embodiments of the present disclosure.

In some embodiments, step/operation 401, step/operation 402, and/or step/operation 403 may be performed in accordance with the various steps/operations of the process 500 that depicted in FIG. 5, which is a flowchart diagram of an example process for receiving one or more satellite navigation system location values. In some embodiments, the one or more satellite navigation system location values are received before, simultaneously with, or after the one or more internal measurement values.

At step/operation 501, the computing entity 200 (e.g., object heading determination system computing entity), may include means such as the processing unit 204, network adaptor 265, input device interface 242, system memory 206, or the like, for receiving one or more satellite navigation location values for an object, such as object 101, via a network interface. The one or more satellite navigation location values may be determined based at least in part on one or more satellite navigation signals received by the object from one or more satellites. The one or more satellite navigation signals may be received by the object using one or more receivers 306 and may be provided to the object heading determination system computing entity 200 via network interface 320.

Each satellite navigation location value of the one or more satellite navigation location values may be associated with a particular time point. As such, the satellite navigation location values for the object may be determined in chronological order. From the one or more satellite navigation location values, one or more inference measurements pertaining to the object can be made. For example, the location, direction of travel, speed, and/or the like of the object may be determined based at least in part on the one or more satellite navigation location values.

In some embodiments, the initially received satellite navigation location values corresponding to a first time point may be initialization satellite navigation location values. For example, the satellite navigation location values corresponding to a first time point may be the initial location of the object. As such, these initial satellite navigation location values may be received by the object heading determination system computing entity 200 and initialized as the initial satellite navigation location values. In some embodiments, the initial satellite navigation location values may be used as the initial location of the object.

At step/operation 502, the computing entity 200 (e.g., object heading determination system computing entity), may include means such as the processing unit 204, network adaptor 265, input device interface 242, system memory 206, or the like, for determining a satellite navigation location uncertainty value for each satellite navigation location value. In some embodiments, the object heading determination system computing entity 200 may determine a satellite navigation location uncertainty value based at least in part on a time duration between two or satellite navigation location values, an initial location of the object, the geographic region pertaining to the location of the object, the one or more internal measurement values pertaining to the object, and/or the like. Particular geographic regions, such as dense areas or areas with tall buildings, may reduce the accuracy of satellite navigation location value. For example, the satellite signal may be blocked due to an environmental object or may be reflected off an environmental object, leading to multipath errors. As such, the satellite navigation location uncertainty value for objects within such environments may be higher to indicate the increased variability of satellite navigation signals. Additionally, the satellite navigation location uncertainty value may be based at least in part on a time duration between time duration between two or more satellite navigation location values. For example, if a time duration between two satellite navigation location values is short but the change between the satellite navigation location value changes by a sufficient threshold amount, the satellite navigation location uncertainty value may be increased due to the unlikelihood of such a large change occurring within a short time period.

At step/operation 503, the computing entity 200 (e.g. object heading determination system computing entity), may include means such as the processing unit 204, system memory 206, or the like to generate an estimated heading data object using a probabilistic heading model. The probabilistic heading model may be configured to process at least the one or more internal measurement values and the one or more satellite navigation location values for the object to generate the estimated heading data object. In some embodiments, the probabilistic heading model may process the one or more internal measurement values and the one or more satellite navigation location values to generate one or more estimated heading values. In some embodiments, the probabilistic heading model also processes the one or more determined internal measurement uncertainty values for each internal measurement and the one or more satellite navigation location uncertainty values for each satellite navigation location value. The one or more internal measurement uncertainty values and satellite navigation location value may be indicative of the degree to weight the internal measurement value and satellite location value.

In some embodiments, the time duration between two or more internal measurement values and/or two or more satellite navigation location values may be determined and used in part by the probabilistic heading model to generate the estimated heading data object. For example, a shorter duration between the two or more internal measurement values may be indicative that the internal measurements values should be weighted more heavily than the satellite navigation location values. The time duration between two or more internal measurement values and/or two or more satellite navigation location values may be used in tandem with the internal measurement uncertainty value for each internal measurement value and the satellite navigation location uncertainty value for each satellite navigation location value to determine one or more estimated heading values.

Figure 6:
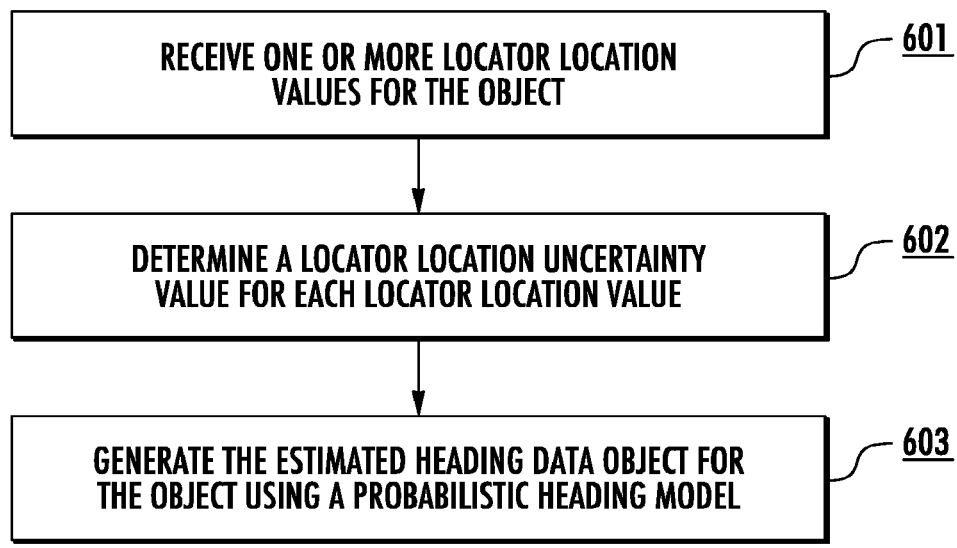
FIG. 6 is a flowchart diagram representing an example process receiving one or more locator location values for a vehicle in accordance with various embodiments of the present disclosure.

In some embodiments, step/operation 401, step/operation 402, and/or step/operation 403 may be performed in accordance with the various steps/operations of the process 600 that depicted in FIG. 6, which is a flowchart diagram of an example process for receiving one or more locator location values. In some embodiments, the one or more locator location values are received before, simultaneously with, or after the one or more internal measurement values and/or satellite navigation location values.

At step/operation 601, the computing entity 200 (e.g., object heading determination system computing entity), may include means such as the processing unit 204, network adaptor 265, input device interface 242, or the like, for receiving one or more locator location values for the object. The one or more locator location values may be determined using one or more locator units, such as locator units 115*a* and/or 115*b*. In some embodiments, the object heading determination system computing entity 200 may receive the one or more locator location values from the one or more locator units.

The object heading determination system computing entity 200 may be configured with the known locations and proximity range for each locator unit such that the area within the proximity range of the locator unit is known. In an event the locator unit 115*a* and/or 115*b* detects an object 101, such as via a transmitted and/or received signal, the object heading determination system computing entity 200 may receive one or more locator location values detected by a particular locator unit. The object heading determination system computing entity 200 may also receive a locator unit identifier for the one or more locator location values such that the object heading determination system computing entity 200 is able to determine the particular locator unit which detected the object. This may be accomplished in a variety of ways, such as by using a locator unit look-up table configured to determine the location and proximity range for a locator unit using the locator unit identifier.

In some embodiments, the one or more locator location values may be indicative that the object was detected within the proximity of the locator unit. In some embodiments, the one or more locator location values may be further indicative of a particular heading, elevation, distance from the locator unit, and/or the like for the detected object. Each locator location value of the one or more locator location values may be associated with a particular time point.

In some embodiments, the object heading determination system computing entity 200 may determine the one or more internal measurement uncertainty values and/or one or more satellite navigation location uncertainty values based at least in part on the one or more locator location values for the object. For example, a locator location value for an object at a particular time point may coincide or be within a time range of one or more internal measurement values and/or one or more satellite navigation location values. As such, the object heading determination system computing entity 200 may compare the one or more internal measurement values and/or one or more satellite navigation location values to the one or more locator location values and adjust the one or more internal measurement uncertainty value and/or one or more satellite navigation location uncertainty value accordingly. For example, if the object heading determination system computing entity 200 receives a locator location value from a locator unit and a satellite navigation location value indicative of a location that is not within a proximity range of a locator unit, the object heading determination system computing entity may increase the associated satellite navigation location uncertainty value to reflect such a discrepancy.

At step/operation 602, the computing entity 200, may include means such as the processing unit 204, network adaptor 265, input device interface 242, system memory 206, or the like, for determining a locator location uncertainty value for each locator location value. In some embodiments, the object heading determination system computing entity 200 may determine a locator location uncertainty value based at least in part on a locator unit which detected the object. For example, in some embodiments, the object heading determination system computing entity 200 may be configured with a locator unit look-up table stored in an associated memory, such as system memory 206. The locator unit look-up table may provide the one or more locator location uncertainty values for the one or more locator location values detected by a particular locator unit. As such, the object heading determination system computing entity 200 may query the locator unit look-up table using the one or more received locator unit identifier to determine one or more locator location uncertainty values.

At step/operation 603, the computing entity 200, may include means such as the processing unit 204, system memory 206, or the like to generate an estimated heading data object using a probabilistic heading model. The probabilistic heading model may be configured to process at least the one or more internal measurement values and the one or more locator location values to generate the estimated heading data object. In some embodiments, the probabilistic heading model may be configured to process the one or more satellite navigation location values. In some embodiments, the probabilistic heading model may process the one or more internal measurement values and the one or more locator location values to generate one or more estimated heading values. In some embodiments, the probabilistic heading model also processes the one or more determined internal measurement uncertainty values for each internal measurement and the one or more locator location uncertainty values for each locator location value. In some embodiments, the one or more satellite navigation location uncertainty values for each satellite navigation location value are also considered. The one or more internal measurement uncertainty values and locator location value may be indicative of the degree to weight the internal measurement values and locator location values.

At step/operation 404, the computing entity 200 (e.g. object heading determination system computing entity), may include means such as the processing unit 204, network adaptor 265, input device interface 242, or the like, for providing the estimated heading data object to one or more associated user devices. The one or more associated user devices may be predefined in an associated system memory 206 of the computing entity 200. In some embodiments, the one or more associated user devices correspond to one or more end users tasked with performing one or more object tracking tasks for object 101. For example, the one or more associated user devices may determine a current heading for an object and compare the current heading to a desired heading. In an instance where the current heading and the desired heading are not within a predefined threshold, the one or more associated user devices may perform one or more corrective actions. For example, the one or more associated user devices may generate and provide an alert to an onboard computing device of the object such that an end user operating the object is alerted that the object heading needs correction. As another example, in a case the object is an autonomously operated object, such as an autonomous vehicle, the onboard computing device of the object may be provided with updated instructions to correct the heading to the desired heading. The one or more corrective actions may also include comparison between one or more other object attributes, such as a current speed and desired speed. Similarly, the object heading determination system computing entity 200 may provide the onboard computing device of the object with updated instructions to correct one or more other object attributes.

In some embodiments, the generated estimated heading data object may be stored in in an associated memory, such as system memory 206 of the object heading determination system computing entity 200. As such, historical estimated heading data objects pertaining to the object 101 may be made available and used for a variety of tasks, such as for improving the accuracy of the probabilistic heading model.

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

That which is claimed is:

1. A method for automatically tracking a heading of an object, the method comprising:
   receiving, using one or more processors, one or more internal measurement values which pertain to the object, wherein the one or more internal measurement values are measured by an inertial measurement unit associated with the object;
   generating, using the one or more processors and a probabilistic heading model, an estimated heading data object for the object based at least in part on the one or more internal measurement values, wherein the estimated heading data object describes one or more estimated heading values for the object; and
   providing, using the one or more processors, the estimated heading data object to one or more associated user devices.

2. The method of claim 1, wherein generating the estimated heading data object further comprises:
   receiving, using the one or more processors, one or more satellite navigation location values for the object,
   wherein generating the estimated heading data object for the object is based at least in part on the one or more internal measurement values and the one or more satellite navigation location values.

3. The method of claim 1, wherein the estimated heading data object further describes one or more estimated location uncertainty values for one or more of the one or more estimated heading values.

4. The method of claim 1, further comprising:
   detecting, using the one or more processors, an error event; and
   in response to the detection of the error event, generating, using the one or more processors, a heading error data object.

5. The method of claim 4, wherein the error event is detected in response to a determination that the estimated heading data object fails to satisfy one or more estimated heading threshold values.

6. The method of claim 1, wherein generating the estimated heading data object further comprises:
   receiving, from one or more locator units, one or more locator location values for the object, wherein generating the estimated heading data object for the object is based at least in part on the one or more internal measurement values and the one or more locator location values.

7. An apparatus for automatically tracking a heading of an object, the apparatus comprising at least one processing component configured to:
   receive one or more internal measurement values which pertain to the object, wherein the one or more internal measurement values are measured by an inertial measurement unit associated with the object;
   generate, using a probabilistic heading model, an estimated heading data object for the object based at least in part on the one or more internal measurement values, wherein the estimated heading data object describes one or more estimated heading values for the object; and
   provide, using the at least one processing component, the estimated heading data object to one or more associated user devices.

8. The apparatus of claim 7, wherein during generation of the estimated heading data object, the at least one processing component is further configured to:
   receive one or more satellite navigation location values for the object,
   wherein generating the estimated heading data object for the object is based at least in part on the one or more internal measurement values and the one or more satellite navigation location values.

9. The apparatus of claim 7, wherein the estimated heading data object further describes one or more estimated location uncertainty values for one or more of the one or more estimated heading values.

10. The apparatus of claim 7, wherein the at least one processing component is further configured to:
    detect an error event; and
    in response to the detection of the error event, generate a heading error data object.

11. The apparatus of claim 10, wherein the error event is detected in response to a determination that the estimated heading data object fails to satisfy the one or more estimated heading values.

12. The apparatus of claim 7, wherein during generation of the estimated heading data object, the at least one processing component is further configured to:
    receive, from one or more locator units, one or more locator location values for the object,
    wherein generating the estimated heading data object for the object is based at least in part on the one or more internal measurement values and the one or more locator location values.

13. A computer program product configured for automatically tracking a heading of an object, the computer program product comprising at least one non-transitory computer-readable storage medium having computer-readable program code portions stored therein, the computer-readable program code portions configured, upon execution, to:
    receive one or more internal measurement values which pertain to the object, wherein the one or more internal measurement values are measured by an inertial measurement unit associated with the object;
    generate, using a probabilistic heading model, an estimated heading data object for the object based at least in part on the one or more internal measurement values, wherein the estimated heading data object describes one or more estimated heading values for the object; and
    provide the estimated heading data object to one or more associated user devices.

14. The computer program product of claim 13, wherein during generation of the estimated heading data object, the computer-readable program code portions are further configured, upon execution, to:
- receive one or more satellite navigation location values for the object,
- wherein generating the estimated heading data object for the object is based at least in part on the one or more internal measurement values and the one or more satellite navigation location values.

15. The computer program product of claim 13, wherein the computer-readable program code portions are further configured, upon execution, to:
- detect an error event; and
- in response to the detection of the error event, generate a heading error data object.

16. The computer program product of claim 13, wherein during generation of the estimated heading data object, the computer-readable program code portions are further configured, upon execution, to:
- receive, from one or more locator units, one or more locator location values for the object,
- wherein generating the estimated heading data object for the object is based at least in part on the one or more internal measurement values and the one or more locator location values.

\* \* \* \* \*